United States Patent

[11] 3,622,176

| [72] | Inventor | Lawrence C. Byer<br>Farmington, Mich. |
|---|---|---|
| [21] | Appl. No. | 8,789 |
| [22] | Filed | Feb. 5, 1970 |
| [45] | Patented | Nov. 23, 1971 |
| [73] | Assignee | Ford Motor Company<br>Dearborn, Mich. |

[54] MOTOR VEHICLE INSTRUMENT PANEL ELEMENT
5 Claims, 6 Drawing Figs.

[52] U.S. Cl. ................................................ 280/150 AB,
229/51 TS, 180/90
[51] Int. Cl. ....................................................... B60r 21/10
[50] Field of Search........................................... 280/150
AB, 150 B; 180/90; 229/51 DB, 51 TS

[56] References Cited
UNITED STATES PATENTS
2,640,623   6/1953   Ryder ........................ 229/51 TS UX

| 3,514,124 | 5/1970 | Richardson .................. | 280/150 |
| 3,532,360 | 10/1970 | Leising et al.................. | 280/150 |
| 3,539,200 | 11/1970 | Chute ........................... | 280/150 |

Primary Examiner—Kenneth H. Betts
Attorneys—John R. Faulkner and E. Dennis O'Connor ABSTRACT: A one-piece, decorative panel adapted to be included in a motor vehicle instrument panel assembly and be positioned between a seated passenger and a confinement or air bag that may be inflated to restrain passenger movement during rapid vehicle deceleration. The panel is formed from deformable plastic material. The surface of the panel adjacent the inflatable confinement has a plurality of grooves formed therein in an H-shaped parting configuration. Upon inflation of the confinement, pressure is exerted on the panel causing the panel to rupture along the parting configuration to form a pair of flaps that are deformed to create a panel aperture through which the confinement may pass to move toward the passenger.

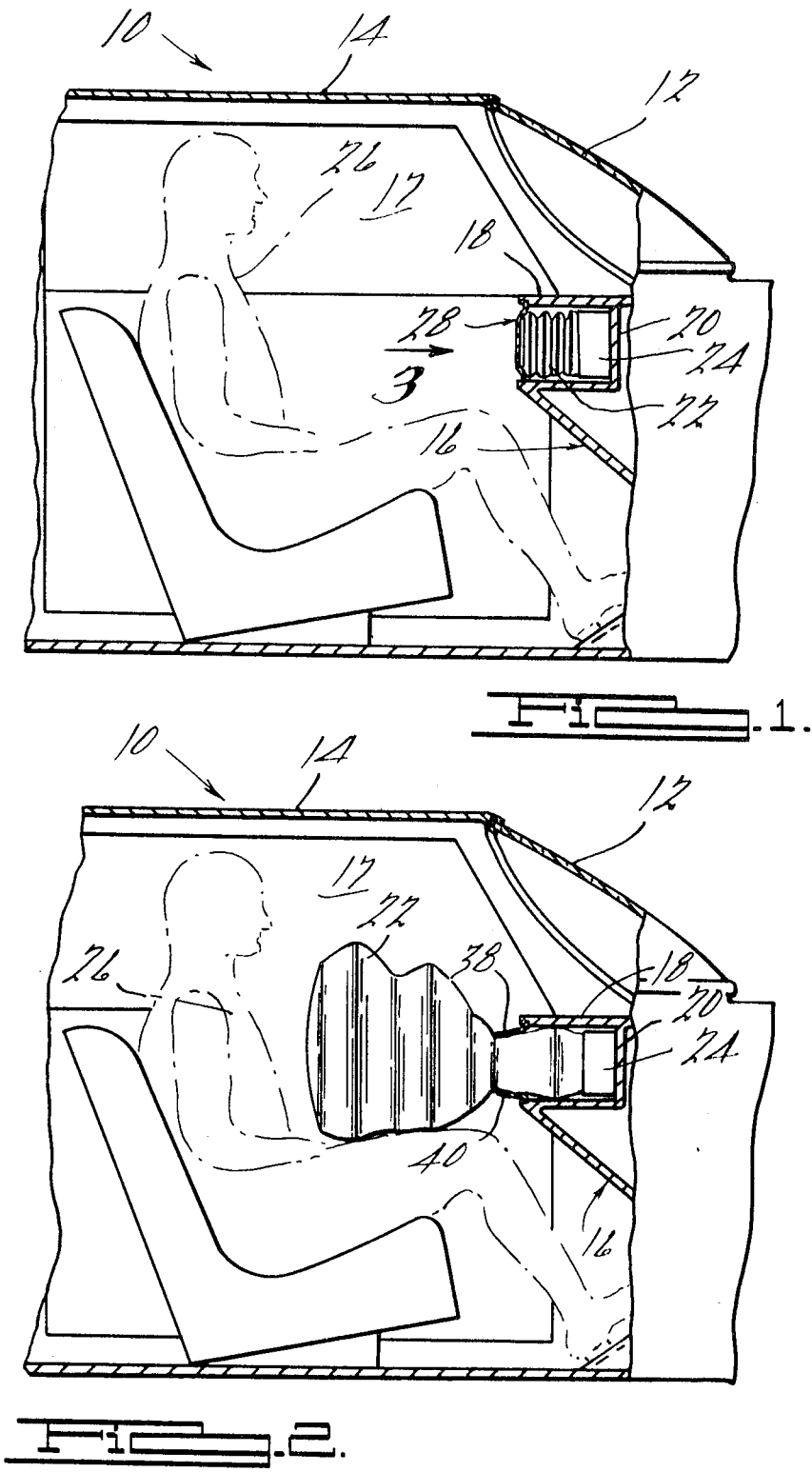

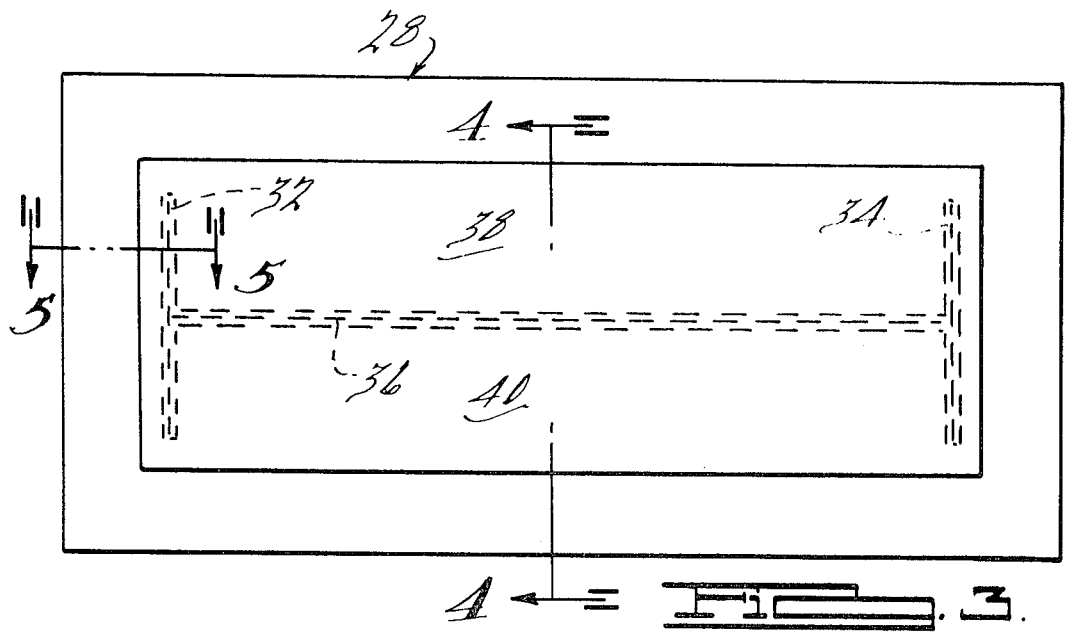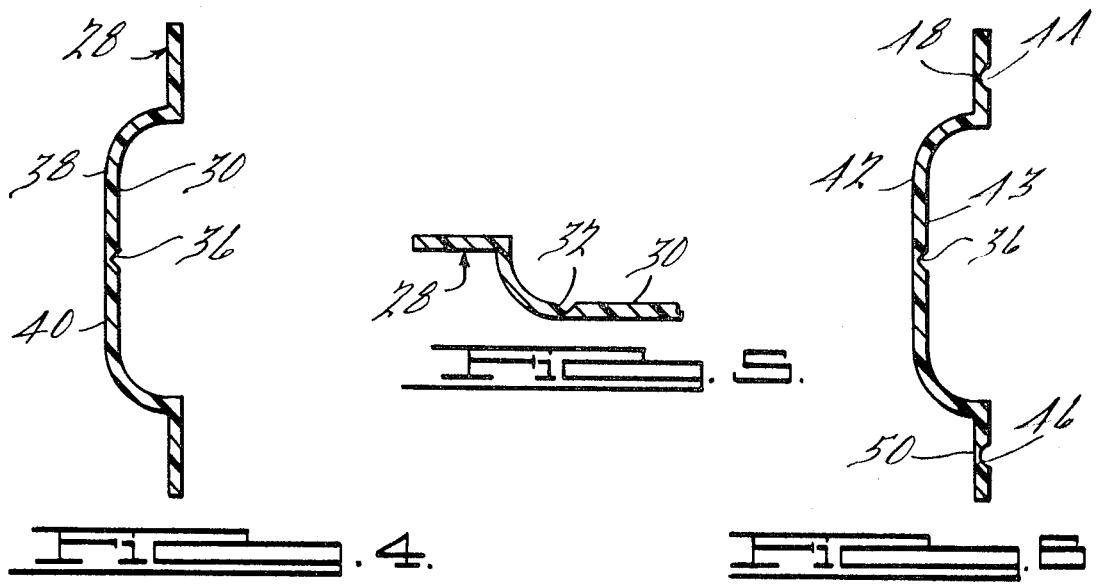

MOTOR VEHICLE INSTRUMENT PANEL ELEMENT

BACKGROUND OF THE INVENTION

Inflatable confinements or air bags adapted to restrain a vehicle passenger from sudden movement during rapid vehicle deceleration are well known in the art. An example of such an inflatable confinement may be seen in U.S. Pat. No. 3,411,807. As may be seen from this patent, it is proposed to mount the inflatable confinement in the instrument panel assembly forward of a seated passenger. The confinement is connected to a source of high-pressure gas capable of being actuated to inflate the confinement in a small fraction of a second. The high-pressure gas source is actuated in response to an external stimulus upon rapid deceleration of the vehicle as would occur during a vehicle collision.

In a commercially acceptable application of the inflatable confinement passenger restraint concept, it is necessary to provide means that conceal the confinement and high-pressure gas source from view when these elements are in the normal, inoperative condition. Such means are necessary so that the vehicle structure defining the limits of the passenger compartment is aesthetically pleasing. Of course, the means concealing the inflatable confinement from view must not unduly inhibit movement of the confinement toward the passenger during confinement inflation. Relatively unrestricted confinement movement is necessary for satisfactory performance of the confinement function described above.

It is an object of this invention to provide such means for concealing an inflatable confinement. The means contemplated herein comprise a one-piece panel that may be manufactured simply and inexpensively and that will appear aesthetically pleasing as an element of a vehicle instrument panel assembly. Also, although this one-piece panel functions under normal conditions to conceal an inflatable confinement, inflation of the confinement causes an aperture to be formed in the panel allowing passage of the confinement into the passenger compartment and into proximity with the passenger to be restrained.

SUMMARY OF THE INVENTION

The one-piece, decorative panel of this invention is adapted to cooperate with other vehicle body structure to define the vehicle passenger compartment. The vehicle in which the panel is included includes an inflatable confinement positioned forwardly of a seated passenger. The panel is positioned adjacent the inflatable confinement and between the confinement and the passenger. The panel is formed from deformable plastic material an has formed therein a plurality of grooves comprising a predetermined parting configuration. The grooves are formed in the surface of the panel proximate the confinement. The configuration is H shaped such that pressure on the panel by the confinement during inflation of the confinement will cause a parting of the panel along the configuration to form an aperture through the panel for the passage of the confinement into the passenger compartment. The parting of the panel along the parting configuration causes the panel to separate into a pair of deformable flaps that are forced into the passenger compartment by the pressurized confinement, but remain attached to the remainder of the panel.

DESCRIPTION OF THE DRAWINGS

FIG. 1 is a schematic side elevation view, partially in section, of a portion of motor vehicle including a one-piece instrument panel element constructed in accordance with this invention;

FIG. 2 is a view similar to FIG. 1 but showing the instrument panel element in the position that it assumes when an inflatable confinement included in the vehicle is partially inflated;

FIG 3 is a view of the one-piece instrument panel element as viewed along the arrow 3 of FIG. 1;

FIG. 4 is a sectional view taken along the line 4—4 of FIG. 3;

FIG. 5 is a partial sectional view taken along the line 5—5 of FIG. 3; and

FIG. 6 is a view similar to FIG. 4 but illustrating a second embodiment of this invention.

DETAILED DESCRIPTION OF THE INVENTION

Referring now in detail to the drawings and in particular to FIG. 1 thereof, the numeral 10 denotes generally a motor vehicle including the instrument panel element of this invention. This vehicle includes a windshield 12, roof 14 and instrument panel assembly 16. These elements cooperate with other body structure to define a vehicle passenger compartment 17.

The instrument panel assembly 16 includes a dash panel portion 18 extending substantially horizontally below the windshield 12. It is understood that conventionally this dash panel portion 18 is covered with foam padding or other energy-absorbing material. A structural support portion 20 of the instrument panel assembly 18 mounts an inflatable confinement 22, that also may be described as an air bag, and a source 24 of pressurized gas. The gas source 24 is responsive to a signal that occurs upon rapid deceleration of the vehicle. When actuated by this signal, the source 24 of pressurized gas releases such gas into the inflatable confinement 22. Figure 2 illustrates inflatable confinement 22 partially inflated and will be referred to later in greater detail. When inflated, the confinement 22 is operative to restrain a vehicle passenger 26 against sudden movement.

A one-piece decorative panel 28 is included in the vehicle instrument panel assembly 16 and is positioned between inflatable confinement 22 and the passenger 26 such that it conceals the inflatable confinement and gas source 24 from view. The decorative panel may be seen in greater detail in FIGS. 3, 4 and 5.

Panel 28 has a substantially planar form but may be somewhat contoured in order to increase its decorative function. Panel 28 may be formed as by molding from deformable plastic material. The surface 30 of panel 28 proximate confinement 22 has formed therein a pair of spaced-apart vertical grooves 32 and 34. These vertical grooves are connected by a horizontal groove 36 extending therebetween. The grooves 32, 34 and 36 are V shaped such that upon a pressure being exerted against surface 30 and a deformation of panel 28 occurring, stresses will be concentrated at the root of these grooves such that a fracture of the panel 28 will occur along the grooves. It thus may be appreciated that the grooves 32, 34 and 36 comprise an H-shaped parting configuration.

With reference to FIG. 2 of the drawings, it may be appreciated that upon the source 24 of pressurized gas being rendered operative, the initial inflation of confinement 22 will cause a pressure to be exerted on surface 30 of panel 28. This pressure will tend to deform the panel 28 outwardly into the passenger compartment 17. This will result in a rupture of the panel 28 along the H-shaped parting configuration. This rupture will cause a formation on panel 28 of upper and lower flaps 38 and 40 respectively. The continued pressure exerted by the confinement 22 on the rear surface of panel 28 will cause flaps 38 and 40 to be deformed outwardly into the passenger compartment 17 (FIG. 2) and the formation of an aperture in the panel 28. The formation of this aperture makes it possible for the passage of the confinement 22 through the panel 28 and into the passenger compartment 17 wherein the confinement, when inflated, functions to restrain movement of the passenger.

It readily may be appreciated that panel 28 may comprise only a small portion of the lateral extent of the front face of the instrument panel assembly 16. This is desirable since panel 28 is severely deformed and rendered unacceptable for further inclusion in the vehicle after an inflation of the confinement 22. If the panel 28 is a small portion of the vehicle instrument panel assembly 16, it readily may be replaced simply and inexpensively following an inflation of the inflatable confinement.

FIG. 6 illustrates a second embodiment of decorative panel that may function as a motor vehicle instrument panel element. Decorative panel 42 is identical to panel 28 except the surface 43 of panel 42 proximate to the inflatable confinement has formed therein a pair of horizontally extending grooves 44 and 46. It may be seen that these grooves have rounded roots as opposed to the V-shaped grooves comprising the parting configuration of the panel. Since the root of grooves 44 and 46 are rounded, stresses are distributed rather than concentrated so that a deformation of the panel 42 will not result in a fracture of this panel along the grooves 44 and 46.

It thus may be appreciated that the portions 48 and 50 of reduced thickness comprise hinge elements that will promote easy deformation of the flaps formed when the panel 42 is ruptured along the H-shaped parting configuration. Inclusion of grooves 44 and 46 in the decorative panel of this invention thus reduces the resistance offered by the panel to movement of the inflatable confinement into the passenger compartment 17.

It thus may be seen that this invention provides a decorative panel that functions as an element of the motor vehicle instrument panel assembly and may be utilized to conceal an inflatable confinement from view from within the vehicle passenger compartment. Upon the inflatable confinement being inflated, the panel of this invention ruptures to provide an aperture through which the inflatable confinement may pass into the passenger compartment and into proximity with the vehicle passenger to be restrained. The panel of this invention may be formed from deformable plastic material according to a molding process that is both simple and inexpensive.

I claim:

1. A one-piece decorative panel partially defining a motor vehicle passenger compartment, said vehicle including an inflatable confinement positioned forwardly of a seated passenger, said panel being positioned adjacent said inflatable confinement and between said confinement and said passenger, said panel being formed from deformable plastic material and having formed therein a plurality of grooves comprising a predetermined parting configuration, said grooves being formed in the surface of said panel proximate said confinement and said configuration being H shaped such that pressure on said panel by said confinement due to inflation of said confinement will cause a parting of said panel along said configuration to form an aperture through said panel for the passage of said confinement into said passenger compartment.

2. A one-piece decorative panel according to claim 1, wherein said grooves are V shaped.

3. A one-piece decorative panel partially defining a motor vehicle passenger compartment, said vehicle including an inflatable confinement positioned forwardly of a seated passenger, said panel being positioned adjacent said inflatable confinement and between said inflatable confinement and said passenger, said panel being formed from deformable material and having formed therein at least three parting lines of reduced thickness arranged in an H configuration, whereby pressure exerted on said panel due to inflation of said confinement will cause a separation of said panel along said parting lines into at least a pair of flaps that are displaced due to a deformation of said material to create an opening in said panel through which said confinement passes into said passenger compartment.

4. A one-piece decorative panel according to claim 3, wherein a plurality of hinge portions of reduced cross section are formed on said panel, each of said hinge portions being positioned to facilitate movement of one of said flaps.

5. A one-piece decorative panel partially defining a motor vehicle passenger compartment, said vehicle including an inflatable confinement positioned forwardly of a seated passenger, said panel being positioned adjacent said inflatable confinement and between said confinement and said passenger, said panel being formed with relatively movable plural portions, said portions normally being joined together along an H-shaped configuration defining two movable flaps, said panel being rupturable along said configuration upon inflation of said confinement to allow movement of at least one of said portions to form an aperture through said panel for the passage of said confinement into said passenger compartment.

* * * * *